US007798556B2

(12) United States Patent
Arenz et al.

(10) Patent No.: US 7,798,556 B2
(45) Date of Patent: Sep. 21, 2010

(54) OPENING DEVICE

(75) Inventors: Bernd Arenz, Herschbroich (DE); Michael Kleinmann, Melsbach (DE); Rainer Massmann, Bonn (DE); Rolf Mintgen, Thuer (DE); Andreas Ritter, Hilgert (DE); Heiko Schilken, Lutzerath (DE)

(73) Assignee: Stabilus GmbH, Koblenz (DE)

( * ) Notice: Subject to any disclaimer, the term of this patent is extended or adjusted under 35 U.S.C. 154(b) by 1016 days.

(21) Appl. No.: 11/474,596

(22) Filed: Jun. 26, 2006

(65) Prior Publication Data

US 2007/0007796 A1 Jan. 11, 2007

(30) Foreign Application Priority Data

Jun. 27, 2005 (DE) ....................... 10 2005 030 054

(51) Int. Cl.
*B60J 5/10* (2006.01)

(52) U.S. Cl. .................................................... 296/146.1

(58) Field of Classification Search .............. 296/146.1, 296/147, 146.8, 146.9, 146.11
See application file for complete search history.

(56) References Cited

U.S. PATENT DOCUMENTS 6,397,434 B1 6/2002 Cheal et al.
7,021,003 B2 * 4/2006 Daniels et al. ................ 49/340
7,393,040 B2 * 7/2008 Guillez et al. ................. 296/76
7,506,556 B2 * 3/2009 Ritter et al. .................. 74/89.2
7,511,396 B2 * 3/2009 Sesita et al. ................. 310/179
2004/0090083 A1 * 5/2004 Greuel et al. ............ 296/146.4
2004/0124662 A1 * 7/2004 Cleland et al. ........... 296/146.4
2005/0168010 A1 * 8/2005 Cleland et al. ........... 296/146.8
2006/0043763 A1 * 3/2006 Berklich et al. .......... 296/146.4
2006/0181108 A1 * 8/2006 Cleland et al. ........... 296/146.4
2006/0255621 A1 * 11/2006 Arquevaux ............... 296/146.4

FOREIGN PATENT DOCUMENTS

DE 197 58 130 A 1 9/1998
JP 2001-355373 12/2001
JP 2002-242532 8/2002
JP 2003-239621 8/2003

* cited by examiner

*Primary Examiner*—H Gutman
(74) *Attorney, Agent, or Firm*—Cohen Pontani Lieberman & Pavane LLP

(57) ABSTRACT

An opening device for a flap of a vehicle, in particular for a rear flap, pivotable about a horizontal pivot axis on the upper edge of an opening in the vehicle body from a closed position into an open position having a gas-filled spring coupled to the body by the free end of its piston rod at a distance from the pivot axis and coupled to the flap by its pressure tube at a distance from the pivot axis. The gas-filled spring in the exload direction applies a force to the flap in the opening direction. Furthermore, an actuator can act on the flap in the opening direction. The actuator is an energy accumulator which, applies a force to the flap during its opening stroke from the closed position until a relaxed position of the energy accumulator is reached.

26 Claims, 7 Drawing Sheets

OPENING DEVICE

BACKGROUND OF THE INVENTION

1. Field of the Invention

The invention relates to an opening device for a flap of a vehicle, in particular for a rear flap, which can be pivoted about a horizontal pivot axis on the upper edge of an opening in the vehicle body from a downwardly directed closed position into an upwardly directed open position.

2. Description of the Related Art

A known device has a gas-filled spring which is coupled by the free end of its piston rod at a distance from the pivot axis to the flap or to the body and which is coupled by its pressure tube at a distance from the pivot axis to the body or to the flap. The gas-filled spring in the exload direction applies a force to the flap in the opening direction, and a torque can act on the flap in the opening direction by means of an actuator arranged on the body.

In an opening device of this type, it is known that, in addition to the gas-filled spring, a pivot lever, which is driven by a reversibly drivable motor, acts as an actuator on the flap. The gas-filled spring is intended to assist the pivoting drive by the pivot lever.

A design of this type is complicated and expensive.

SUMMARY OF THE INVENTION

It is therefore a object of the invention to provide an opening device of the type mentioned at the beginning, the construction of which is simple and only requires a small installation space.

According to the invention, the actuator is an energy accumulator which, from its loaded position, applies a force to the flap during its opening stroke from the closed position until a relaxed position of the energy accumulator is reached.

Since the actuator is only required during an opening movement, it can be of simple design acting in just one direction. The closing movement obtains its assistance, which is opposed to the action of the gas-filled spring, by means of the weight of the flap. This leads to it being possible for the flap to be closed with just a little manual force.

The relaxed position is preferably reached when the flap has reached an opening angle from which the gas-filled spring can automatically continue to open the flap.

To provide the force of the energy accumulator, the latter, preferably after the relaxed position is reached, can be moved into its loaded position by means of a loading device.

Its force therefore does not oppose a closing movement of the flap.

The reaching of the relaxed position can be detectable by a sensor which can then initiate a movement of the loading device into the loaded position.

To reduce the overall sizes and the required construction space, the energy accumulator can be arranged on the piston rod and can apply a force to the pressure tube such that it can move in the exload direction of the piston rod.

However, it is also possible for the energy accumulator to be arranged on the body and to apply a force to the flap via one or more pressure elements.

In a simple design which is not prone to defects, the pressure element may be a pressure cable guided in a sheath or a pressure tappet.

It is likewise of simple construction and not prone to defects if the energy accumulator is a spring accumulator.

The spring accumulator may have a helical coil compression spring.

In order to load the loading device, the latter may be drivable by electric motor, with it being possible for the loading device to be drivable in the loading direction and in the relaxing direction by a reversible electric motor.

If, in this case, the loading device can be driven by the electric motor via a gear, then the energy accumulator can be kept in its preloaded position by the self-locking of the gear, with the result that a separate device is not required for this.

A small overall size can be achieved with a threaded rod driven rotatably by the electric motor, the threaded rod engaging a threaded bore of a rotationally fixed, axially movable nut which is supported at one end of the helical coil compression spring, which is arranged axially with respect to the threaded rod and is supported fixedly at its other end. It is possible for the nut to be supported on the helical coil compression spring via a spring cup.

Construction space is furthermore saved if the pressure tube of the gas-filled spring can have a force applied to it by the energy accumulator such that it can be displaced in the exload direction of the piston rod.

In this case, that end of the piston rod which protrudes out of the pressure tube can be connected fixedly to a guide part in which that end region of the pressure element which is opposite the energy accumulator is guided such that it can be displaced axially with respect to the longitudinal extent of the gas-filled spring. It is possible for the pressure tube to have a force applied to it by the end region of the pressure element such that it can be displaced in the exload direction of the piston rod.

For this purpose, the pressure tube can have a radially protruded pressure element which can be pressurized by the pressure element in the exload direction of the piston rod.

According to a further design, a single-arm pivot lever is coupled by its one end to the pressure tube of the gas-filled spring, at a distance from its end which is coupled to the body or to the flap, in a manner such that it can pivot about an axis parallel to the pivot axis. The lever is supported by its other free end on a part fixed on the body and can have a force applied to it by the energy accumulator in a manner such that it can pivot at a distance from the axis. The end of the pressure tube which is coupled to the body being connected fixedly to a guide part in which that end region of the pressure element which is opposite the energy accumulator is guided in a manner such that it can be displaced axially with respect to the longitudinal extent of the gas-filled spring, with it being possible for the end region of the pressure element to cause the pivot lever to apply a force to the gas-filled spring in a manner such that it can move in the opening direction of the flap.

That end of the piston rod which protrudes out of the pressure tube is preferably connected fixedly to a guide part in which that end region of the pressure element which is opposite the energy accumulator is guided such that it can be displaced axially with respect to the longitudinal extent of the gas-filled spring, with it being possible for the end region of the pressure element to cause the pivot lever to apply a force to the gas-filled spring in a manner such that it can move in the opening direction of the flap.

For the purposes of support and good relative mobility, the free end of the pivot lever can be supported on a sliding track connected fixedly to the body.

According to a further simply constructed and space-saving design, the energy accumulator is arranged on the gas-filled spring, with it being possible for the spring accumulator to be supported by its one end on the pressure tube of the gas-filled spring and by its other end on the free end of the piston rod. It is possible for the spring accumulator to be loaded by the loading device and to be locked in its loaded position.

In this case, the helical coil compression spring forming the spring accumulator can surround the piston rod and can be supported by its first end on the pressure tube via a supporting cup arranged displaceably on the piston rod, which results in a compact construction.

In this case, the spring accumulator may also be arranged coaxially with respect to the piston rod in a housing cup and may be supported by its second end on the base of the housing cup which coaxially has an opening through which the piston rod is guided.

In order to load the spring accumulator, a traction cable is fastened to the supporting cup, the traction cable extending parallel to the piston rod and being drivable by the loading device such that it can move in the compression direction of the spring accumulator. So that the spring accumulator remains in its loaded position, it can be lockable in its loaded position by a locking device.

According to another design of the opening device which is likewise of simple construction and requires little construction space, the energy accumulator has a torsion spring which is arranged on the rear flap and by means of which a pivot lever, which can be pivoted on the flap about an axis coaxial or parallel to the pivot axis, can be driven pivotably such that it spreads out from the plane of the flap. It is possible for the pivot lever to be supported by its end opposite the pivot axis on the vehicle body.

For this purpose, the pivot lever can be fastened in a radially protruding manner on a drive shaft which can be driven rotatably about the axis and on which a cable drum which is at least partially surrounded by a traction cable is arranged, and which is acted upon by the torsion spring in a direction of rotation, with it being possible for the traction cable to be driven by the loading device in a movable manner rotating the cable drum and loading the torsion spring.

Other objects and features of the present invention will become apparent from the following detailed description considered in conjunction with the accompanying drawings. It is to be understood, however, that the drawings are designed solely for Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
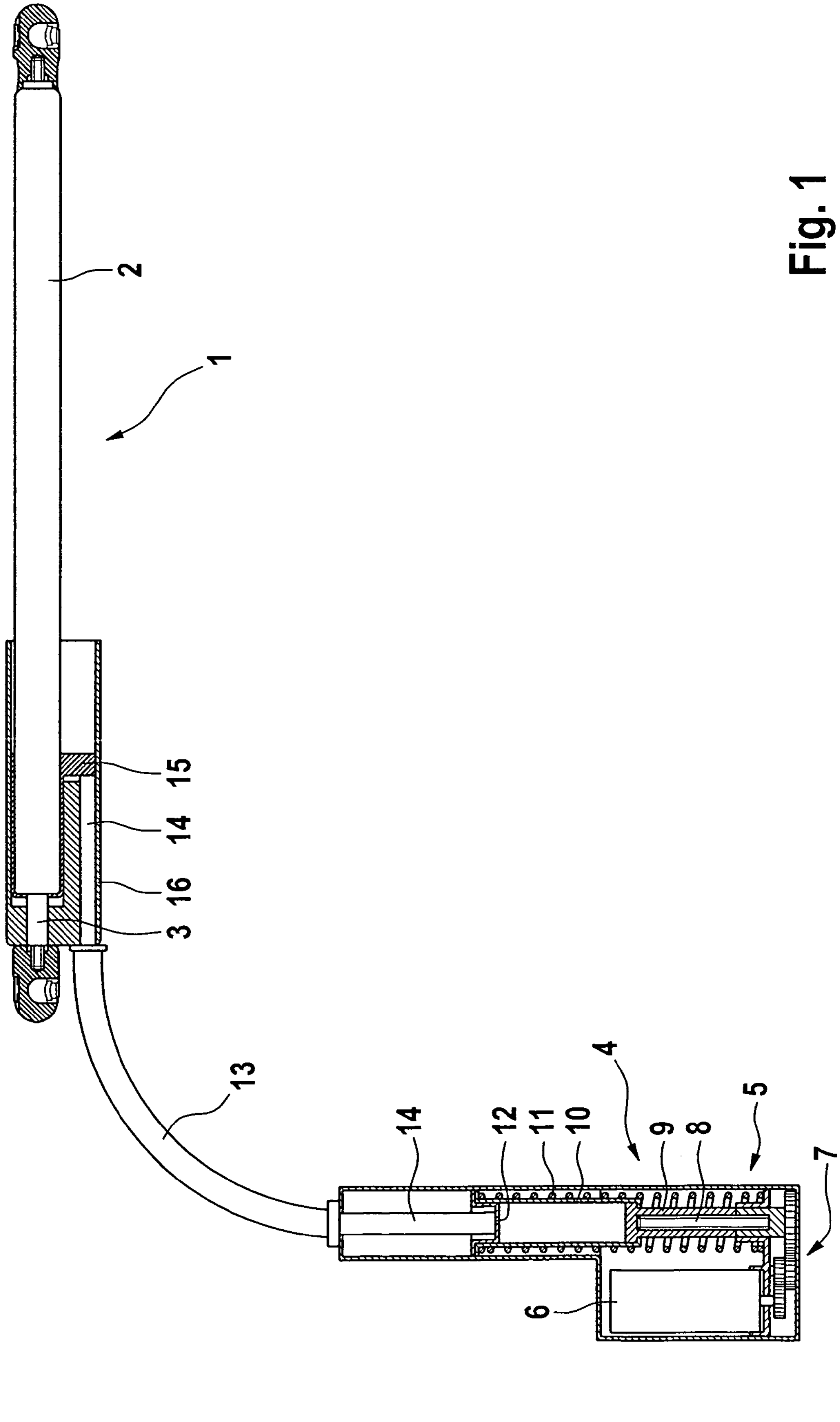
FIG. 1 shows a cross-sectional view of a first exemplary embodiment of an opening device.

The opening devices illustrated in the figures are arranged in a motor-vehicle rear flap (not illustrated) which can be pivoted about a horizontal pivot axis on the upper edge of an opening in the motor-vehicle body from a downwardly directed closed position into an upwardly directed open position.

The opening devices have a gas-filled spring 1 with a pressure tube 2 and a piston separating the pressure tube 2 into two working chambers filled with pressurized gas. A piston rod 3 which is guided in a sealed manner out of the pressure tube 2 on one side is arranged on the piston.

Furthermore, the opening devices have energy accumulators 4 which can be moved into their loaded position by means of loading devices 5, 5' and which, in addition to the gas-filled spring 1, can apply a force to the flap during its opening stroke from the closed position.

Figure 2:
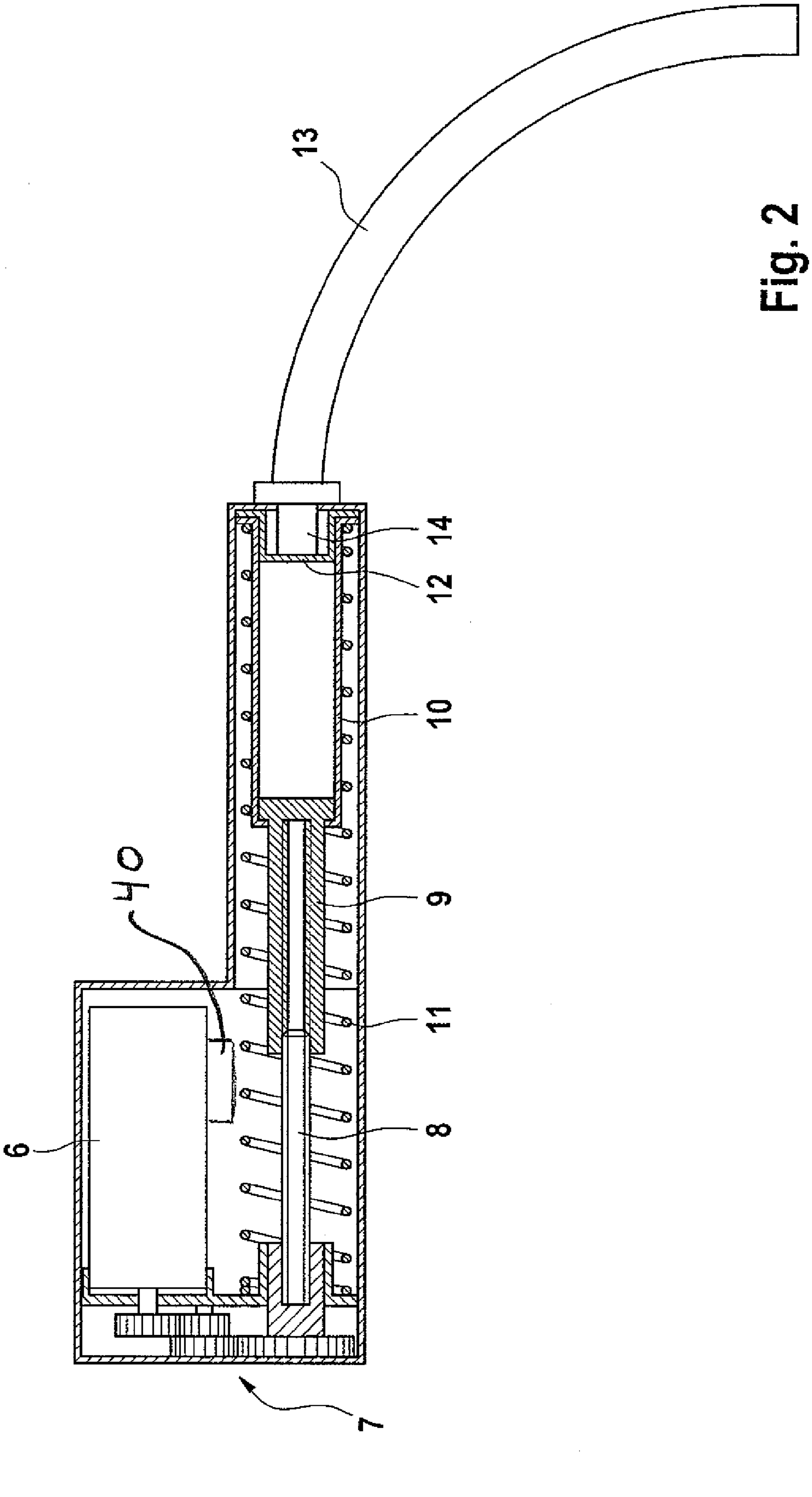
FIG. 2 shows an enlarged cross-sectional view of the tensioning device of the opening device according to FIG. 1.
Figure 3:
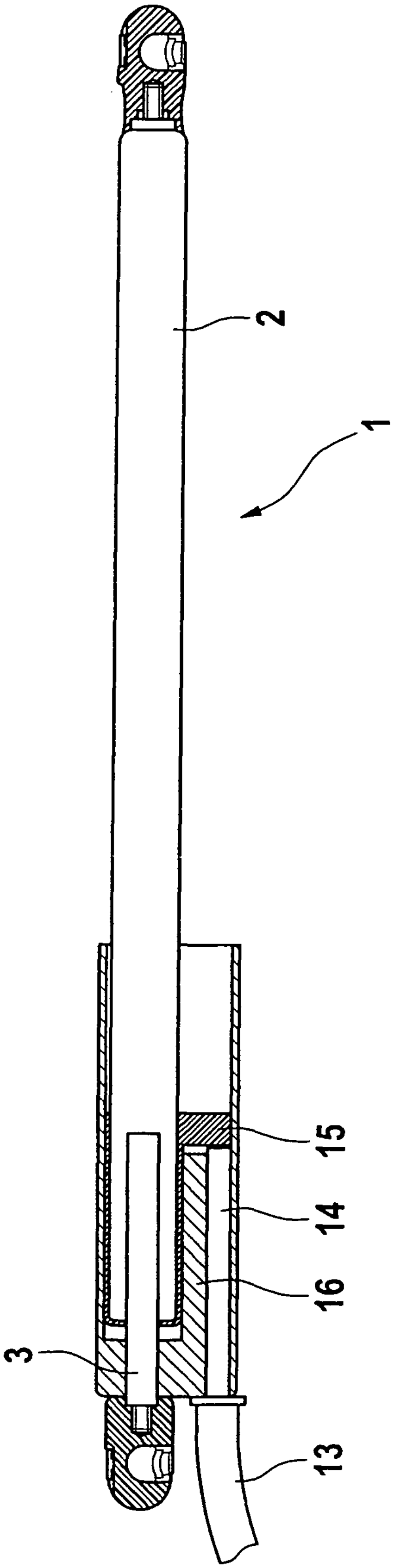
FIG. 3 shows an enlarged cross-sectional view of the gas-filled spring region of the opening device according to FIG. 1.

In the case of the exemplary embodiment of FIGS. 1 to 3, the loading device 5 has a reversible electric motor 6 which uses a gear 7 to rotatably drive a threaded rod 8 which engages in a rotationally fixed, axially movable nut 9.

A spring cup 10 on which the one end of a helical coil compression spring 11 is supported is arranged on the nut 9. The helical coil compression spring 11 surrounds the nut 9 and the threaded rod 8 and is supported fixedly by its other end in the region of the gear 7.

FIG. 1 illustrates the loading device 5 in its loaded position before the energy accumulator 4 has assisted an opening movement of the flap.

For this purpose, an inner cup 12, which is inserted fixedly into that end of the spring cup 10 which faces away from the nut 9, bears with its base against the end side of a pressure cable 14 which is guided displaceably in a sheath 13, the other end of which can act upon a pressure element 15. The pressure element 15 is fastened to the pressure tube 2 in a radially protruding manner.

That end of the piston rod 3 which protrudes out of the pressure tube 2 is connected fixedly to a guide part 16 in which the pressure cable 14 is guided displaceably parallel to the piston rod 3.

The free end of the piston rod 3 is coupled to the body at a distance from the pivot axis of the rear flap and that end of the pressure tube 2 which is opposite this free end of the piston rod 3 is coupled to the rear flap at a distance from the pivot axis.

If the rear flap is to be moved from its closed position into its open position, the electric motor 6 uses the gear 7 to drive the threaded rod 8 in such a manner that the nut 9 and the spring cup 10 move in the relaxing direction of the helical coil compression spring 11. In the process, the helical coil compression spring 11, which is compressed in the closed position, relaxes and pushes the pressure cable 14 out of the loading device 5 through the inner cup 12.

As a result, the other end of the pressure cable 14 acts upon the pressure element 15 and moves the pressure tube 2 from the position illustrated in FIG. 3 in the extension direction relative to the piston rod. This takes place in addition to the extension force inherent to the gas-filled spring 1, with the result that initially an opening movement of the rear flap is brought about with an increased application of force.

If a horizontal position of the rear flap is passed through during this movement, the helical coil compression spring reaches its position in which it can be relaxed to maximum extent, with the result that the further opening movement of the rear flap is only brought about by the gas-filled spring 1. This is easily possible since now the effective lever of the rear flap is reduced and therefore less force is required for the opening movement.

When the helical coil compression spring 11 has reached its position in which it can be relaxed to maximum extent, as determined in one embodiment by a sensor 40, as illustrated in FIG. 2, the electric motor 6 reverses its direction of rotation, so that the helical coil compression spring 11 is brought again via the spring cup 10 into its loaded position (FIG. 1).

If the rear flap is now to be closed again, its weight, if appropriate, assisted by a small manual application, brings about a closing of the rear flap counter to the force of the gas-filled spring 1.

Figure 4:
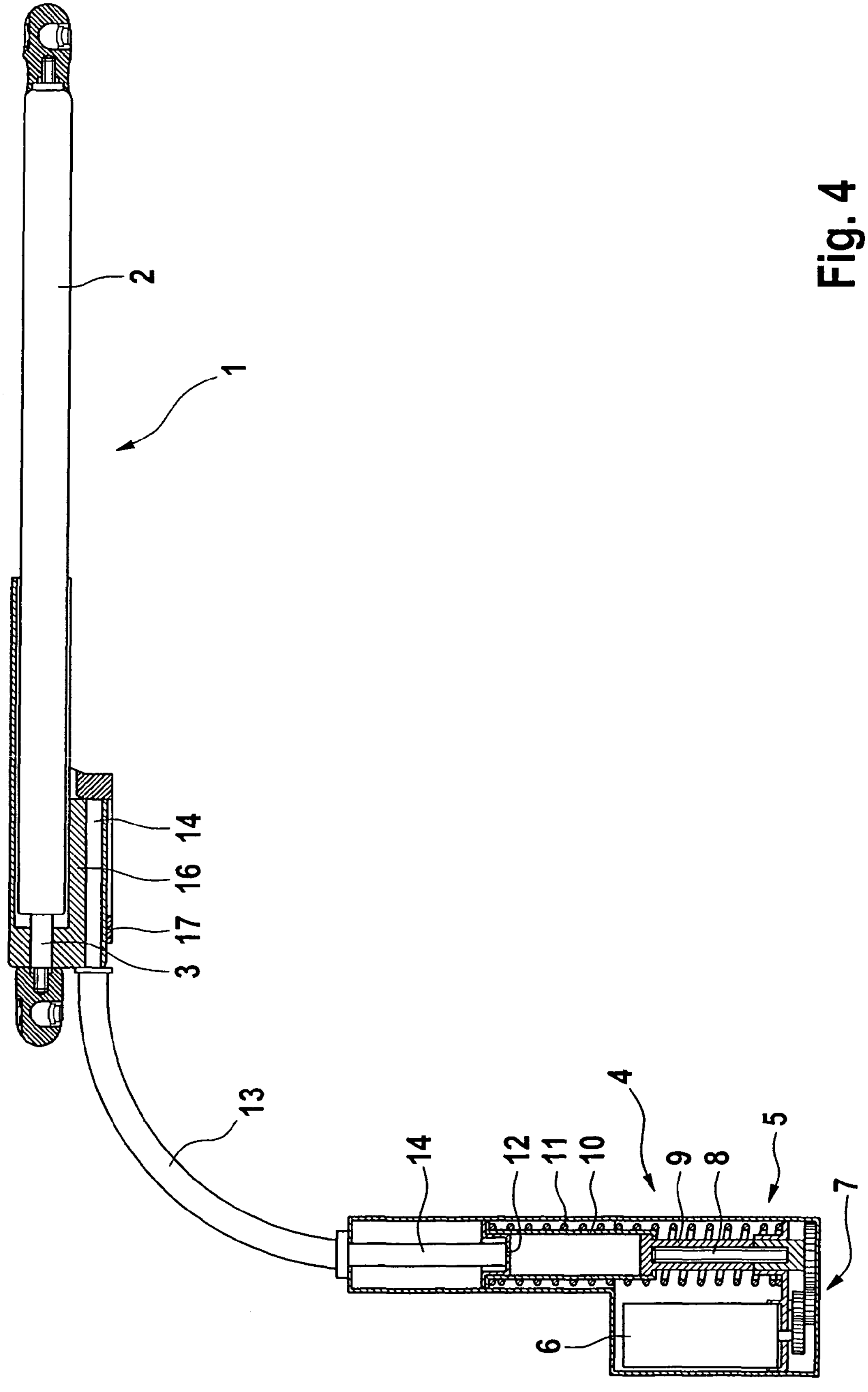
FIG. 4 shows a cross-sectional view of a second exemplary embodiment of an opening device.
Figure 5:
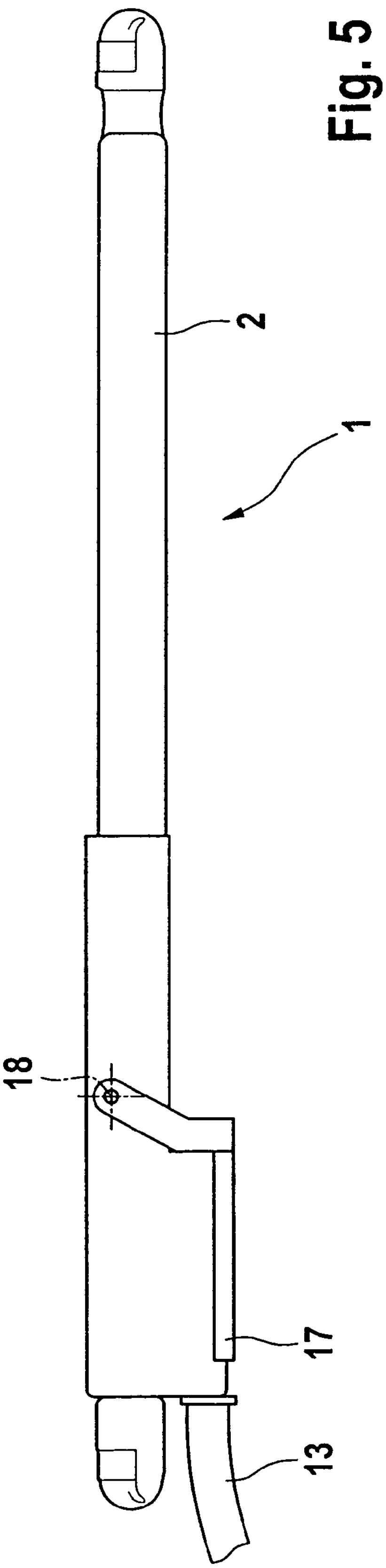
FIG. 5 shows an enlarged view of the gas-filled spring region of the opening device according to FIG. 4.
Figure 6:
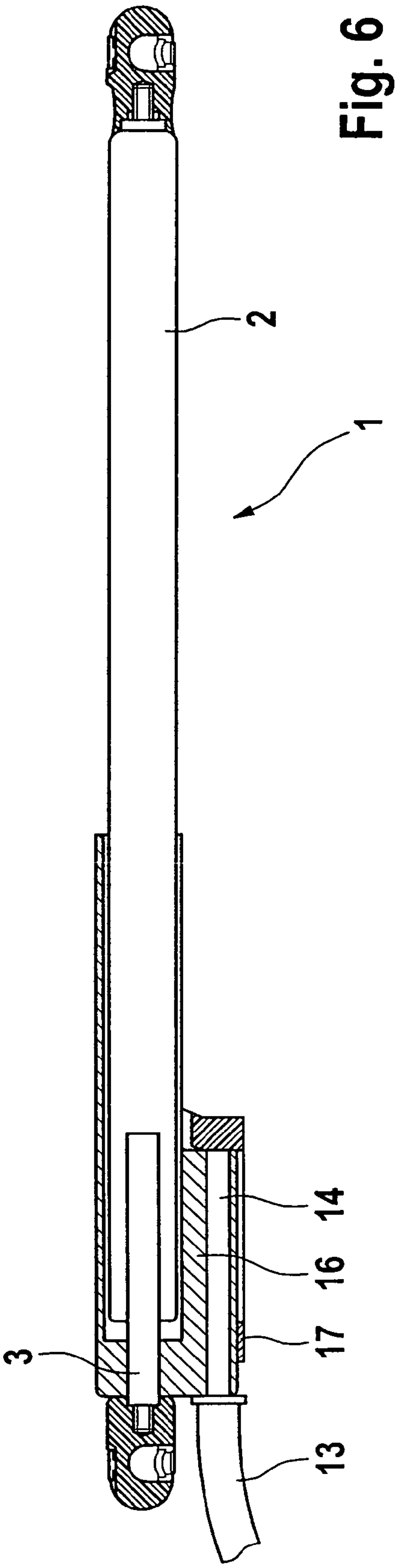
FIG. 6 shows a cross-sectional view of the gas-filled spring region of the opening device according to FIG. 5.
Figure 10:
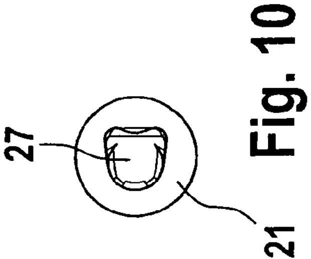
FIG. 10 shows an end view of the opening device according to FIG. 7.

The construction of the opening device illustrated in FIGS. 4 to 6 largely corresponds to the opening device illustrated in FIGS. 1 to 3 and is provided with the corresponding reference numbers.

In contrast to the exemplary embodiment of FIGS. 1 to 3, a single-armed pivot lever 17 instead of a pressure element is arranged on the pressure tube 2.

This pivot lever 17 is coupled by its one end to the pressure tube 2 about an axis 18 parallel to the pivot axis at a distance from that end of the pressure tube 2 which is coupled to the rear flap.

The pivot lever 17 can have a force applied to it by the pressure cable 14 at a distance from the axis 18 and, as a result, it can pivot out of its illustrated position parallel to the gas-filled spring.

The pivot lever 17 is supported by its free end on a sliding track (not illustrated) which is fixed on the body and can be arranged, for example, in the rain channel in the side region of the opening which is to be closed by the rear flap.

When the rear flap is opened, relaxation of the helical coil compression spring 11 causes the pressure cable 14 to be acted upon against the pivot lever 17, with the result that the latter is pivoted away by the gas-filled spring 1. Since it is supported by its free end on the body, a pivoting movement of the gas-filled spring 1 in the opening direction of the rear flap also takes place and therefore the opening movement of the rear flap, which movement is caused by the gas-filled spring 1, is assisted.

In the exemplary embodiment of FIGS. 7 to 10, a supporting cup 19 is arranged displaceably on the piston rod 3 and the one end of a helical coil compression spring 11' of a loading device 5', which helical coil compression spring surrounds the piston rod 3, is supported on the supporting cup. The other end of the helical coil compression spring 11', which extends in the direction towards the free end of the piston rod 3, is supported on the base 20 of a housing cup 21 coaxially surrounding in the manner of a tube a part of the piston rod 3 and that end region of the pressure tube 2 of the gas-filled spring 1 which is in the piston-rod side.

The piston rod 3 is guided through a coaxial opening 22 in the base 20 and, in the vicinity of its free end, has a radially protruding latching lug 23 of a locking device.

The one end of a traction cable 24 is fastened to the supporting cup 19, which traction cable is guided parallel to the piston rod 3 outwards through a lead-through opening 25 to a loading device (not illustrated).

Figure 7:
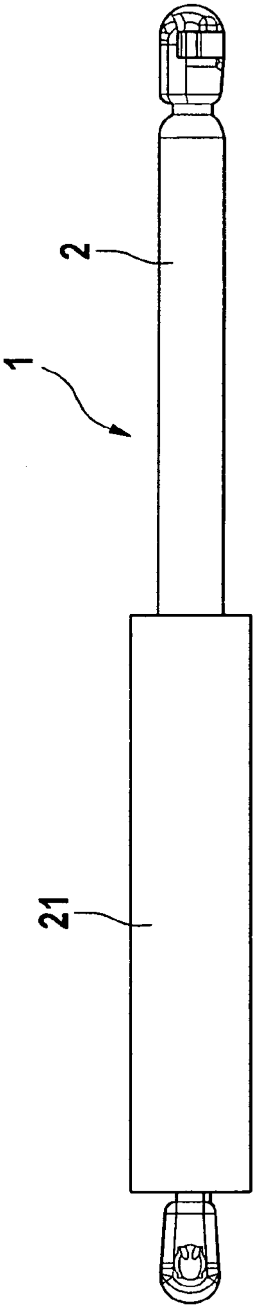
FIG. 7 shows a side view of a third exemplary embodiment of an opening device.
Figure 8:
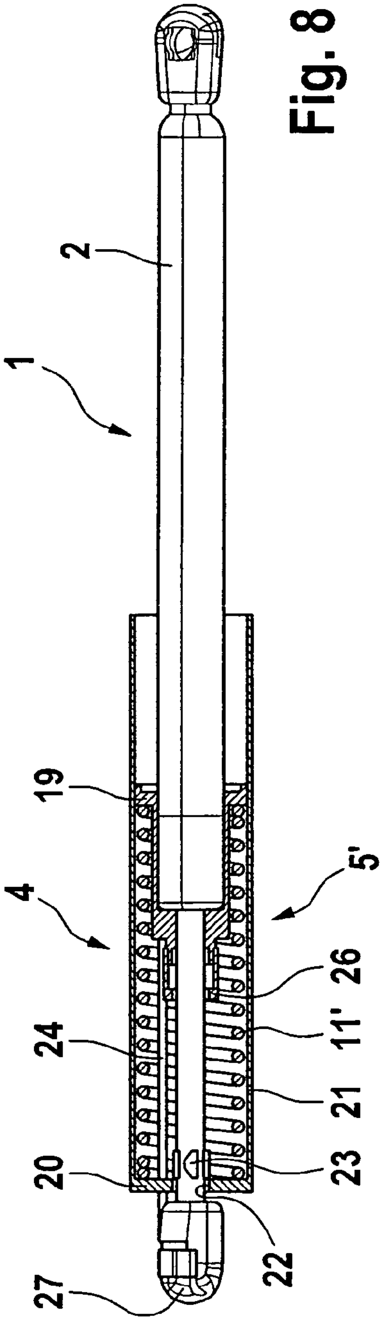
FIG. 8 shows a cross-sectional view of the opening device according to FIG. 7.
Figure 9:
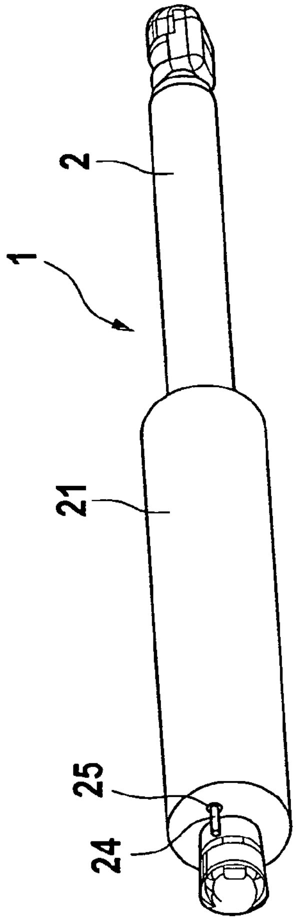
FIG. 9 shows a perspective view of the opening device according to FIG. 7.
Figure 12:
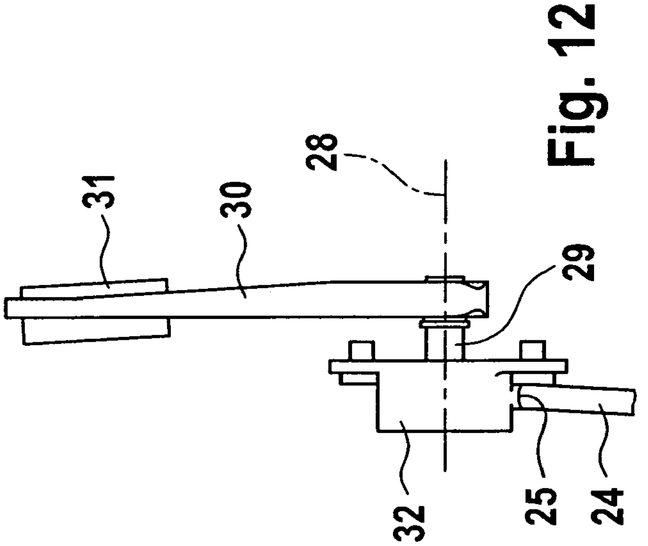
FIG. 12 shows a side view of the opening device according to FIG. 11.
Figure 14:
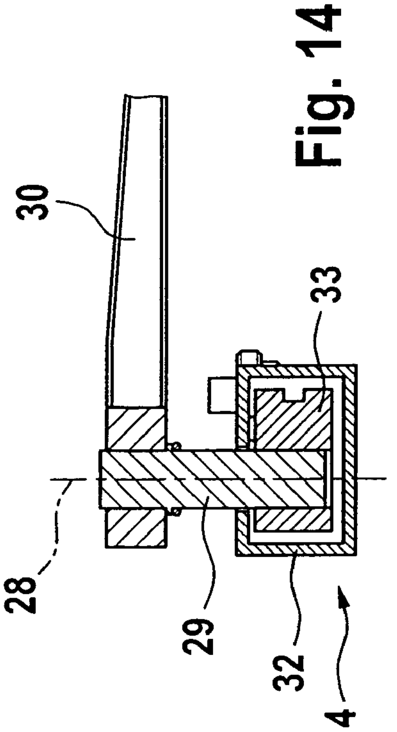
FIG. 14 shows a cross-sectional view along the line XIV-XIV in FIG. 11.
Figure 11:
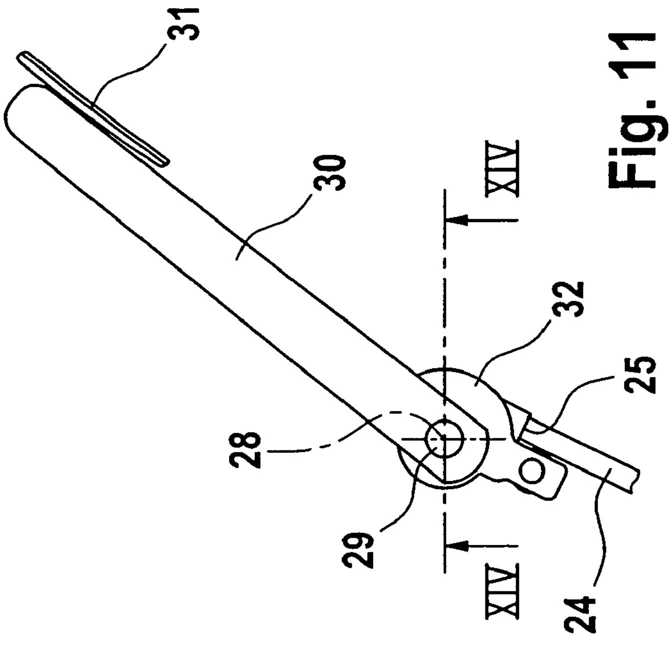
FIG. 11 shows a view of a fourth exemplary embodiment of an opening device.
Figure 13:
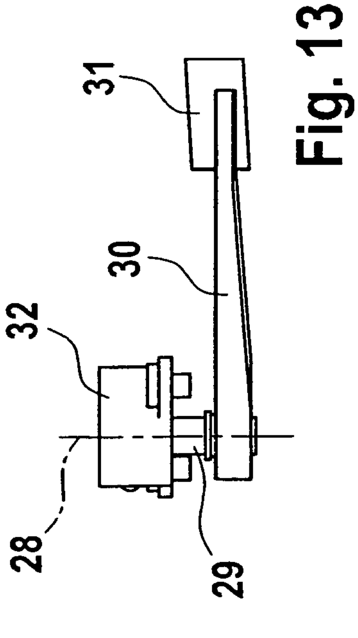
FIG. 13 shows a plan view of the opening device according to FIG. 11.

In FIGS. 7 to 9, the helical coil compression spring 11' is illustrated in a position in which it is two thirds relaxed and can still continue to be loaded up to the vicinity of the mouth opening of the housing cup 21.

In order to load the helical coil compression spring 11', the supporting cup 19 is drawn by the traction cable 24, which is driven by the loading device, as far as the vicinity of the base 20. The latching lug 23 latches there into a retaining element 26, which is arranged on the supporting cup 19, of the locking device, with the result that the supporting cup 19 and the helical coil compression spring 11' are locked in this position which is also adopted when the rear flap is closed.

This locking device operates in accordance with the “ball-point pen principle”.

If the rear flap is to be opened from its closed position, brief pulling on the traction cable 24 causes the locking device to be released. After that, the traction cable 24 is released, so that the helical coil compression spring 11' relaxes until it has reached its relaxed position. In the process, it is supported on the connecting element 27 at the free end of the piston rod 3 via the base 20 and on the pressure tube 2 via the supporting cup 19, with the result that the extension movement of the piston rod 3 by the gas-filled spring is now assisted by the helical coil compression spring 11'.

If the helical coil compression spring 11' has reached its relaxed position, the piston rod 3 extends further, solely by means of the gas-filled spring, into its end position, in which the rear flap is completely opened.

At the same time, a loading of the helical coil compression spring 11' by the device takes place again, so that the said helical coil compression spring does not cause any counter-force during a subsequent closing of the rear flap.

In the case of the opening device illustrated in FIGS. 11 to 14, the gas-filled spring is situated at a different location from the energy accumulator 4 and the mechanism actuated by the energy accumulator 4.

This mechanism comprises a drive shaft 29 which is mounted rotatably about an axis 28 coaxial or parallel to the pivot axis of the rear flap and at one end of which a pivot lever 30 protrudes away radially. The pivot lever 30 is supported by its free end on a sliding track 31 which is fixed on the body and can be arranged, for example, in the rain channel in the side region of the opening which is to be closed by the rear flap.

The other end of the drive shaft 29 protrudes into a drive housing 32 arranged fixedly on the rear flap and supports a cable drum 33 arranged fixedly on the drive shaft 29. An end region of a traction cable 24 at least partially surrounds the cable drum 33, the end of the traction cable 24 being connected fixedly to the cable drum 33.

The traction cable 24 is guided out of the drive housing 32 through a lead-through opening 25 to a loading device (not illustrated).

A torsion spring (not illustrated) of an energy accumulator 4, which torsion spring is arranged on the drive housing 32, is supported on the drive housing 32 and acts upon the drive shaft 29 counter to the unwinding direction of the traction cable 24 from the cable drum 33.

When the rear flap is closed, the torsion spring is loaded and is kept in its loaded position by the traction cable, for example.

If the rear flap is to be opened, the traction cable 24 is released, so that the torsion spring rotates the drive shaft 29 and the pivot lever 30 is pivoted.

By the free end of the pivot lever 30 being supported on the body via the sliding track 31 a torque acts in the opening direction on the rear flap, assisting the opening force of the gas-filled spring over the first part of the opening travel of the rear flap.

If the torsion spring has reached its relaxed position, the further opening movement of the rear flap is brought about solely by the gas-filled spring and the torsion spring is tensioned again by means of the loaded device by the traction cable 24 being driven in traction mode.

On the rear flap, a single opening device can be arranged in a side region of the body opening which is to be closed. However, in order to achieve a uniform actuation of the rear flap, a respective opening device is preferably arranged on each side edge of the body opening.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An opening device for a flap of a vehicle body having an opening with an upper edge, said flap being pivotable about a horizontal pivot axis on the upper edge from a downwardly directed closed position to an upwardly directed open position, said device comprising:

a gas-filled spring having a pressure tube with a piston connected to a piston rod, said piston rod having one end extending from said piston tube and coupled to one of said flap and said body at a distance from the pivot axis, said pressure tube being coupled to the other of said flap and said body at a distance from the pivot axis, said gas filled spring applying a force to the flap in the opening direction;

an energy accumulator which is in a loaded position when the flap is in the closed position and applies force to the flap during an opening stroke from said closed position toward said open position until a relaxed position of said accumulator is reached; and a loading device which can move the energy accumulator back to said loaded position after the relaxed position is reached.

2. The opening device of claim 1, further comprising a sensor which can detect when the relaxed position is reached.

3. The opening device of claim 1 wherein the energy accumulator is arranged on the piston rod and applies a force on the pressure tube to urge the pressure tube in an exload direction of the piston rod.

4. The opening device of claim 3 further comprising:

a guide part fixed to the end of the piston rod extending from the pressure tube; and a pressure element by which the energy accumulator can apply a force on the flap, said pressure element having an end region guided in the guide part and connected to the pressure tube so that the energy accumulator can apply a force to the pressure tube to displace the pressure tube in the exload direction of the piston rod.

5. The opening device of claim 4 wherein the pressure element is configured to radially project from the pressure tube.

6. The opening device of claim 3 further comprising a single arm pivot lever which is pivotably coupled to said pressure tube on an axis which is parallel to the pivot axis, said pivot lever having a free end which is supported on said body, said pivot lever being acted on by said energy accumulator so that it can pivot with respect to said pressure tube.

7. The opening device of claim 6 further comprising:

a guide part fixed to the end of the piston rod extending from the pressure tube; and a pressure element by which the energy accumulator can apply a force on the flap, said pressure element having an end region guided in the guide part and connected to the pivot lever so that the pivot lever can apply a force to the pressure tube to displace the pressure tube in the opening direction of the flap.

8. The opening device of claim 7 wherein the end of the piston rod extending from the piston tube is coupled to the vehicle body.

9. The opening device of claim 6 further comprising a slide track fixed to the vehicle body, the free end of the pivot lever being supported in the slide track.

10. The opening device of claim 1 wherein the energy accumulator can be arranged on the vehicle body, the opening device further comprising a pressure element by which the energy accumulator can apply a force on the flap.

11. The opening device of claim 10 wherein the pressure element comprises a pressure cable in a sheath.

12. The opening device of claim 10 wherein the pressure element comprises a pressure tappet.

13. The opening device of claim 1 wherein the energy accumulator comprises a spring accumulator.

14. The opening device of claim 13 wherein the spring accumulator is a helical coil compression spring.

15. The opening device of claim 14, wherein the loading device comprises:

an electric motor;

a threaded rod which can be driven in rotation by said electric motor; and a rotationally fixed, axially moveable nut having a threaded bore engaging said threaded rod;

wherein said helical coil compression spring is arranged axially with respect to said threaded rod and has a first end supporting said nut and a second end which is supported fixedly.

16. The opening device of claim 15 further comprising a spring cup located on said first end of said spring and supporting said nut.

17. The opening device of claim 1, wherein the loading device comprises an electric motor.

18. The opening device of claim 17 wherein the electric motor is a reversible electric motor which can drive the energy accumulator in both loading and relaxing directions.

19. The opening device of claim 18 wherein the loading device further comprises a gear driven by the electric motor.

20. The opening device of claim 1, wherein the energy accumulator comprises a spring accumulator arranged on the gas-filled spring, the spring accumulator having one end supported on the pressure tube and the other end supported on the end of the piston rod, wherein the spring accumulator can be loaded by the loading device.

21. The opening device of claim 20 further comprising a supporting cup arranged displaceably on the piston rod, the spring accumulator comprising a helical coil compression spring surrounding the piston rod and having a first end supported on the pressure tube via the supporting cup.

22. The opening device of claim 21 further comprising housing cup arranged coaxially around said piston rod and having a base with an opening through which the piston rod is guided, the spring accumulator being arranged in the housing cup and having a second end supported against the base.

23. The opening device of claim 21 further comprising a traction cable fastened to the supporting cup and extending parallel to the piston rod and being driveable by the loading device to compress the spring accumulator.

24. The opening device of claim 20 further comprising a locking device for locking the spring accumulator in the loaded position.

25. The opening device of claim 1, further comprising a pivot lever which is pivotably mounted on the flap and has a free end supported on the vehicle body, the energy accumulator comprising a torsion spring arranged on the flap and acting on the pivot lever to urge the free end away from the flap.

26. The opening device of claim 25 further comprising:

a drive shaft to which the pivot lever is fixed;

a cable drum fixed to said drive shaft;

a traction cable partially wound on said drum, said traction cable being driven by said loading device to rotate said drum and thereby load said torsion spring.

* * * * *